US008726287B2

(12) United States Patent
Clevenger

(10) Patent No.: US 8,726,287 B2
(45) Date of Patent: May 13, 2014

(54) METHOD FOR REDUCING INTER-PROCESS COMMUNICATION LATENCY

(75) Inventor: Brian Duane Clevenger, Muncie, IN (US)

(73) Assignee: Thomson Licensing, Issy les Moulineaux (FR)

( * ) Notice: Subject to any disclaimer, the term of this patent is extended or adjusted under 35 U.S.C. 154(b) by 83 days.

(21) Appl. No.: 13/294,389

(22) Filed: Nov. 11, 2011

(65) Prior Publication Data

US 2012/0291038 A1 Nov. 15, 2012

Related U.S. Application Data

(60) Provisional application No. 61/416,811, filed on Nov. 24, 2010.

(51) Int. Cl.
*G06F 9/455* (2006.01)
*G06F 9/46* (2006.01)

(52) U.S. Cl.
USPC .................. 718/103; 719/328; 718/108

(58) Field of Classification Search
None
See application file for complete search history.

(56) References Cited

U.S. PATENT DOCUMENTS

| 4,882,674 | A | * | 11/1989 | Quint et al. | 719/320 |
|---|---|---|---|---|---|
| 5,434,975 | A | * | 7/1995 | Allen | 719/312 |
| 5,640,500 | A | * | 6/1997 | Taylor | 345/440 |
| 6,301,602 | B1 | * | 10/2001 | Ueki | 718/103 |
| 6,732,138 | B1 | * | 5/2004 | Browning et al. | 718/102 |
| 7,103,631 | B1 | | 9/2006 | van der Veen | |
| 7,207,040 | B2 | | 4/2007 | Boudnik et al. | |
| 7,523,344 | B2 | | 4/2009 | Qiao et al. | |
| 7,562,363 | B1 | | 7/2009 | Belair et al. | |
| 8,359,588 | B2 | * | 1/2013 | Reid | 717/159 |
| 2002/0138679 | A1 | * | 9/2002 | Koning et al. | 710/244 |
| 2003/0061395 | A1 | * | 3/2003 | Kingsbury et al. | 709/312 |
| 2008/0104600 | A1 | | 5/2008 | May | |
| 2008/0127206 | A1 | * | 5/2008 | Leonov et al. | 719/313 |

OTHER PUBLICATIONS

Borg et al., "A Message System Supporting Fault Tolerance", 1983.*
Ikebe etal: "Reduction of synchronous write response time on call control server", 2007 Australasian telecommunication Networks and Applns Conf. Dec. 2-5, 2007, pp. 509-514.
Comer: "Operating System Design the Xinu Approach" Bell Laboratories ; 7-"Message Passing"; pp. 93-98, 1984.

* cited by examiner

*Primary Examiner* — Abdullah Al Kawsar
*Assistant Examiner* — Bradley Teets
(74) *Attorney, Agent, or Firm* — Robert D. Shedd; Reitseng Lin

(57) ABSTRACT

A method for handling a system call in an operating system executed by a processor is disclosed. The message comprises steps of receiving the system call to a called process from a calling process; if the system call is a synchronous system call and if a priority of the calling process is higher than a priority of the called process, increasing the priority of the called process to be at least the priority of the calling process; and switching context to the called process.

8 Claims, 2 Drawing Sheets

METHOD FOR REDUCING INTER-PROCESS COMMUNICATION LATENCY

CROSS REFERENCE TO RELATED APPLICATION

This application claims priority to and all benefits accruing from a provisional application filed in the United States Patent and Trademark Office on Nov. 24, 2010, and there assigned Ser. No. 61/416,811.

BACKGROUND OF THE INVENTION

1. Field of the Invention

The invention relates to an inter-process communication (IPC) mechanism in or for used with an operating system, and more particularly to an IPC that places the message routing functionality in the kernel, intelligently modifies process priority and manages context switches based on message content to minimize latency for synchronous system calls.

2. Background Information

A synchronous system call is synchronous in time and the calling context (task, process) is blocked from doing anything until the call returns. An asynchronous call, however, just posts a request and continues to perform other functions. The operating system should inform the calling context when the asynchronous call has returned (completed by the called task or process). The operating system is running under a hardware platform that may include a memory for storing software code for the operation system and a processor for executing the operating system.

Synchronous transactions through IPC mechanisms in a conventional operating system suffers from latency partly due to delays in the task scheduler performing the context switches necessary to complete the synchronous transaction. For example, DBus, which is an IPC implementation commonly used in Linux, uses a centralized daemon, which is a process running in the background, for managing a bus for message routing. All processes that wish to talk on the bus must first connect to the daemon. In a normal configuration, processes do not communicate directly with one another. FIG. 1 shows the message flow for an asynchronous DBus transaction as an example. Each time an asynchronous message associated with an asynchronous system call is sent, there must be two socket (end point or application interface call) operations and two context switches in the calling direction. One socket operation is from the client (the calling process) to the daemon and the other is from the daemon to the service (the called process) serving the asynchronous system call. For a synchronous call in DBus, the number of operations is doubled because the return direction may require the same number of operations as the calling direction. As such, the context switch time is long. Furthermore, the context switch time may depend on the priorities of the calling and called processes, as assigned by the operating system.

Accordingly, there is a need for a method that addresses the foregoing problem, and thereby reduces the context switching time. The present invention addresses these and/or other issues.

SUMMARY OF THE INVENTION

In accordance with an aspect of the present invention, a method for handling a system call in an operating system executed by a processor, the method comprising steps of receiving the system call to a called process from a calling process; if the system call is a synchronous system call and if a priority of the calling process is higher than a priority of the called process, increasing the priority of the called process to be at least the priority of the calling process; and switching context to the called process.

In an embodiment, the method further comprises steps of restoring the priority of the called process after the called process has handled the system call, sending a response from the called process to the calling process after the called process has handled the system call, and switching context back to the calling process.

In another embodiment, the method further comprises a step of determining from content of the system call if the system call is a synchronous system call. The system call may include a header section and a payload section and the step of determining from the content of the system call comprising a step of checking a flag in the header section.

In accordance with an aspect of the present invention, a non-transitory computer-readable storage medium structured to store instructions executable by a processor, the instructions when executed causing a processor to receive the system call to a called process from a calling process; if the system call is a synchronous system call and if a priority of the calling process is higher than a priority of the called process, increase the priority of the called process to be at least the priority of the calling process; and switch context to the called process.

In another embodiment, the instructions when executed further causes the processor to restore the priority of the called process after the called process has handled the system call.

In another embodiment, the instructions when executed further causes the processor to send a response from the called process to the calling process after the called process has handled the system call and to switch context back to the calling process.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DESCRIPTION OF THE PREFERRED EMBODIMENTS

Figure 1:
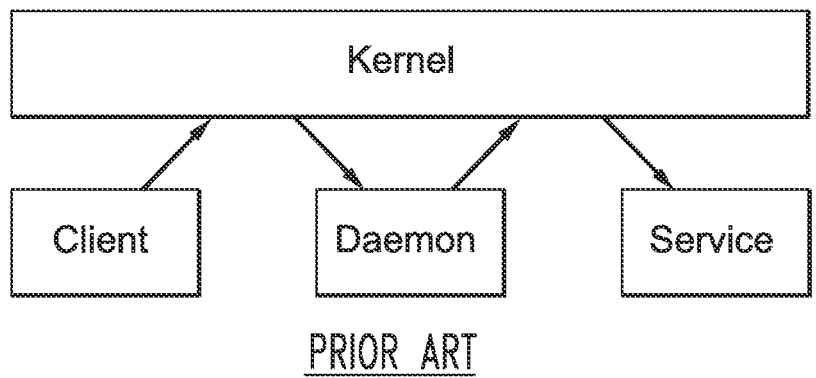
FIG. 1 is a process flow of an asynchronous DBus transaction.

As pointed out in FIG. 1, the latency in a synchronous system call is double to that of an asynchronous system call. Thus, the context switching time of a synchronous system call is much longer than that of an asynchronous system call. The inventors recognize that a possible solution to reduce the latency is avoiding using synchronous system calls and replacing them with asynchronous calls whenever possible. This way, the performance of critical code is less likely to be hindered by latency introduced by synchronous system calls. However, this approach makes programming less flexible.

As such, the inventors analyze the performance of the synchronous calls in DBus by analyzing source code and testing the system using the library package libdbus-c++ on a CE4100 reference platform with varying size payloads. Since the exercised code paths for synchronous and asynchronous system calls are very similar in a conventional operating system, most improvements to the synchronous calls should also affect the performance of asynchronous calls.

Although DBus is used as an example here, the principles of the invention can be applied to any inter-process communication (IPC) mechanism and operating systems, such as Linux, UNIX, and Windows, which include IPC mechanisms. The term "process" is used interchangeably with the term "task" in this specification.

A message associated with a system call in DBus includes a header section and a payload section. The header section may include the following three pieces of information among others: message destination (DESTINATION) for identifying which process is to receive a message, a flag, which is the least significant bit of the $3^{rd}$ byte in the header section in this embodiment, indicating whether the message is synchronous (expects a reply) or asynchronous (no reply expected), and for synchronous messages, some data that can be used to match a message with its response. DBus assigns a unique serial number (REPLY_SERIAL) for each message, which can be used to match a message with its response. The matching is needed to determine when a synchronous transaction is complete. The principles of the invention are not limited to the DBus message format, and can be applied to any message format that comprises a destination identifier, an indicator indicating if the message is synchronous, and some means for matching a message with its response.

According to the principles of the invention, a kernel-based message router that manipulates the task scheduler to optimize context switching for reducing latency for synchronous inter-process communication (IPC) calls is disclosed. That is, the message routing functions of the daemon mentioned previously is moved into the kernel. An advantage of this arrangement is that the number of context switches and message transmissions or socket operations is reduced.

Figure 2:
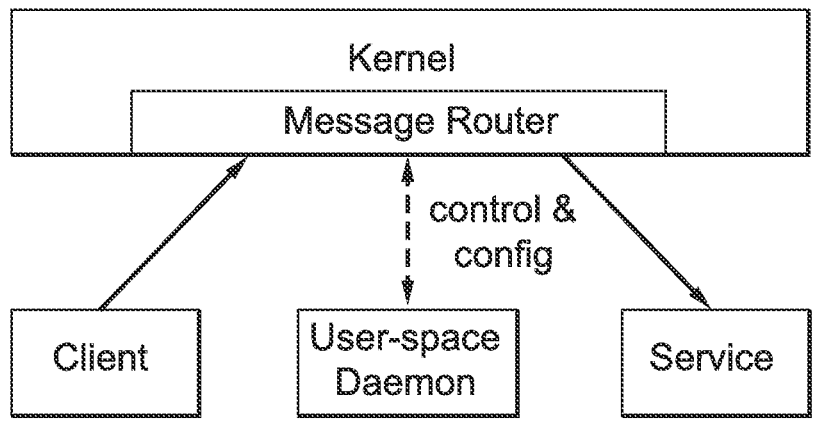
FIG. 2 is an exemplary flow for an asynchronous transaction according to an exemplary embodiment of the present invention.

A user-mode daemon process may still be used for managing configuration. Only the message routing functionality needs to be moved into kernel space to get the performance improvement. FIG. 2 shows the message flow for an asynchronous transaction with this architecture. By having the message routing functionality in the kernel, message transactions are cut in half. The number of context switches required is also reduced. For synchronous operations, reducing the number of message transactions and context switches has the added benefit of reducing latency.

Moving the message routing into the kernel has another advantage. It gives the message router the ability to manipulate the scheduler to further minimize latency for synchronous operations. An embodiment is shown in FIG. 3.

Figure 3:
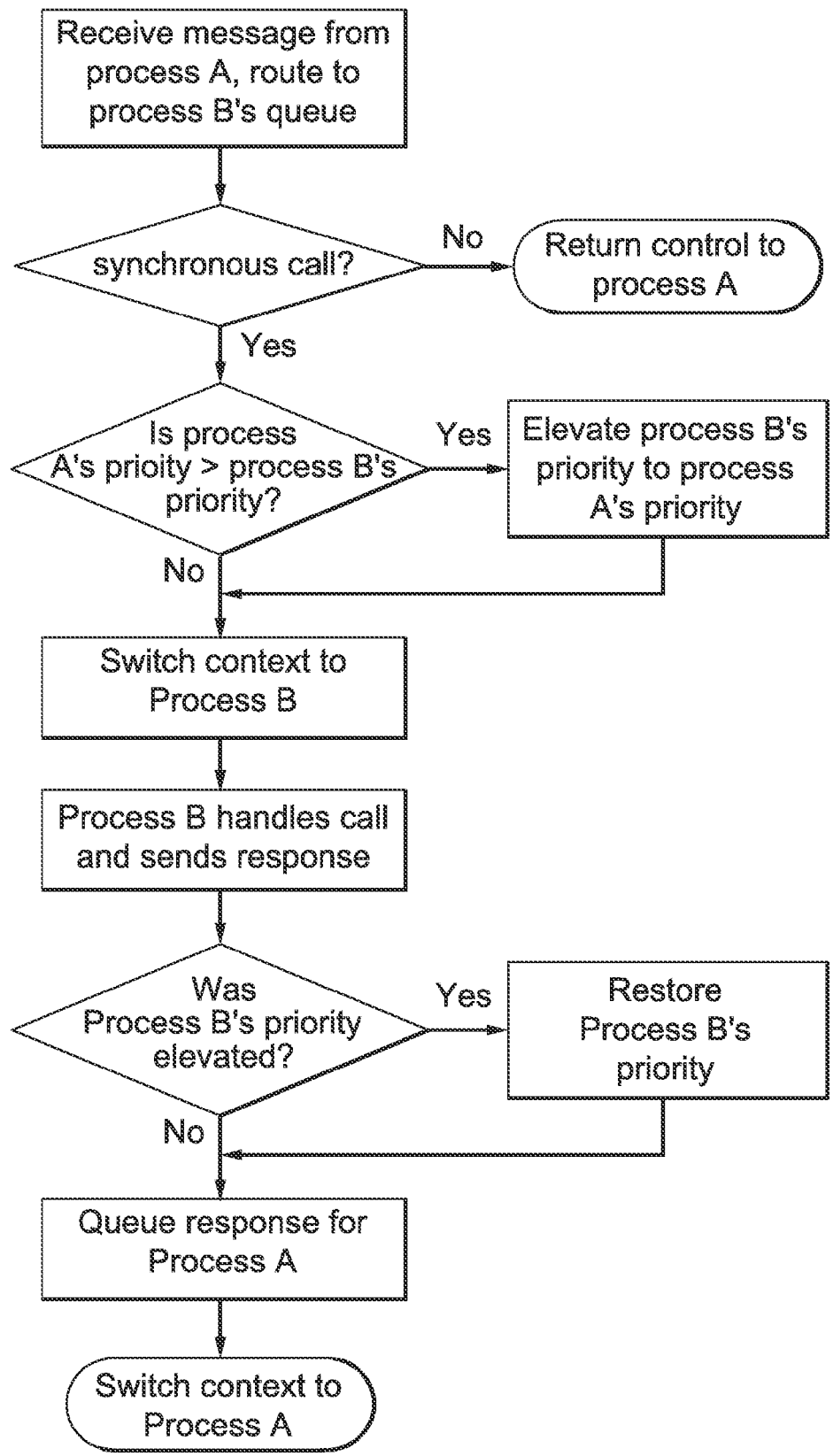
FIG. 3 is an exemplary flow for a synchronous transaction according to an exemplary embodiment of the present invention.

As shown in FIG. 3, when the operating system determines that the system call is a synchronous system call from process A to process B, the operating system determines if process A has a higher priority than process B. If process A does not have a higher priority than process B, the operating system switches the context to process B. However, if process A has a higher priority than process B, the operating system elevate the priority of process B to be equal to or higher than that of process A before switching context to process B.

Thereafter, process B handles the call and sends a response. At this time, if the priority of process B is elevated, the operating system restores the priority of process B before queuing the response for process A and switching the context back to process A.

With the above exemplary algorithm, the latency of the IPC mechanism for synchronous calls is further reduced. The process can be implemented by software or firmware or a combination of both.

The application discloses a method of handling a synchronous system call in an operating system, the method comprising receiving a system call from a calling process, determining if the system call is a synchronous system call, if the system call is a synchronous system call, determining if a priority of the calling process is higher than a priority of a called process, if the calling process has a higher priority, increasing the priority of the called process to be at least the priority of the calling process, and switching context to the called process.

The operating system remembers the original priority of the called process. When the called process has completed the system call and sent a response, the operating system restores the priority of the called process before switching context to the calling process.

The implementations described herein may be implemented in, for example, a method or a process, or a software program. Even if only discussed in the context of a single form of implementation (for example, discussed only as a method), the implementation of features discussed may also be implemented in other forms (for example, a program). The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

Additionally, the methods may be implemented by instructions being performed by a computer, and such instructions (and/or data values produced by an implementation) may be stored on a computer-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a computer-readable medium. Instructions may be, for example, in hardware, firmware, software, or a combination. A processor may be characterized, therefore, as, for example, both a device configured to carry out a process and a device that includes a computer-readable medium (such as a storage device) having instructions for carrying out a process. Further, a computer-readable medium may store, in addition to or in lieu of instructions, data values produced by an implementation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for handling a system call in an operating system executed by a processor, the method comprising steps of:

receiving the system call to a called process from a calling process;

determining from content of the system call if the system call is a synchronous system call;

if the system call is a synchronous system call and if a priority of the calling process is higher than a priority of the called process, increasing the priority of the called process to be at least the priority of the calling process;

switching context to the called process;

sending a response from the called process to the calling process after the called process has handled the system call;

restoring the priority of the called process after the called process has handled the system call; and switching context back to the calling process.

2. The method of claim 1, wherein the system call includes a header section and a payload section and the step of determining from the content of the system call comprising a step of checking a flag in the header section.

3. The method of claim 1, further comprising a step of determining if the priority of the calling process is higher than the priority of the called process.

4. The method of claim 1, wherein message routing between the calling and called processes is performed in a kernel of the operating system.

5. A non-transitory computer-readable storage medium structured to store instructions executable by a processor, the instructions when executed causing a processor to handle a system call in an operating system, including:

receiving the system call to a called process from a calling process;

determining from content of the system call if the system call is a synchronous system call;

if the system call is a synchronous system call and if a priority of the calling process is higher than a priority of the called process, increasing the priority of the called process to be at least the priority of the calling process;

switching context to the called process;

sending a response from the called process to the calling process after the called process has handled the system call;

restoring the priority of the called process after the called process has handled the system call; and switching context back to the calling process.

6. The non-transitory computer-readable storage medium of claim 5, wherein the system call includes a header section and a payload section and to determine from the content of the system call comprises checking a flag in the header section.

7. The non-transitory computer-readable storage medium of claim 5, wherein the instructions when executed further causes the processor to determine if the priority of the calling process is higher than the priority of the called process.

8. The non-transitory computer-readable storage medium of claim 5, wherein message routing between the calling and called processes is performed in a kernel of the operating system.

* * * * *